(12) United States Patent
Schmidt et al.

(10) Patent No.: US 9,598,017 B2
(45) Date of Patent: *Mar. 21, 2017

(54) TEARDROP SHAPED VEHICULAR MIRROR

(71) Applicant: Rosco, Inc., Jamaica, NY (US)

(72) Inventors: William Schmidt, Newport, MI (US);
Daniel M. Swain, Wyandotte, MI (US)

(73) Assignee: Rosco, Inc., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,447

(22) Filed: Jul. 15, 2014

(65) Prior Publication Data

US 2014/0320991 A1 Oct. 30, 2014

Related U.S. Application Data

(63) Continuation of application No. 12/328,929, filed on Dec. 5, 2008, now Pat. No. 8,777,428, which is a continuation of application No. 11/422,131, filed on Jun. 5, 2006, now Pat. No. 7,699,479, which is a continuation-in-part of application No. 29/214,660, filed on Oct. 6, 2004, now Pat. No. Des. 528,484.

(51) Int. Cl.
*B60R 1/08* (2006.01)
*G02B 5/10* (2006.01)

(52) U.S. Cl.
CPC ............... *B60R 1/08* (2013.01); *B60R 1/082* (2013.01); *G02B 5/10* (2013.01)

(58) Field of Classification Search
CPC ............. B60R 1/082; B60R 1/08; G02B 5/10
USPC ........................................ 359/838, 866, 868
See application file for complete search history.

(56) References Cited

U.S. PATENT DOCUMENTS

| | | | | |
|---|---|---|---|---|
| 2,455,919 A | * | 12/1948 | Daon | ............................ 248/482 |
| 4,436,372 A | | 3/1984 | Schmidt et al. | |
| 4,580,881 A | * | 4/1986 | Kim | ............................ 359/868 |
| 4,730,914 A | * | 3/1988 | Stout | ............................ 359/868 |
| 4,822,157 A | | 4/1989 | Stout | |
| 5,005,963 A | | 4/1991 | Schmidt et al. | |
| 5,084,785 A | * | 1/1992 | Albers et al. | ................. 359/868 |
| 5,198,936 A | | 3/1993 | Stringfellow | |
| 5,307,211 A | | 4/1994 | Schmidt et al. | |
| D346,783 S | * | 5/1994 | Brainard | ....................... D12/187 |
| D365,073 S | * | 12/1995 | Nagano | ......................... D12/187 |
| 5,589,984 A | | 12/1996 | Schmidt et al. | |

(Continued)

OTHER PUBLICATIONS

Mirrors; Harley-Davidson 2001 Genuine Motor Accessories and Genuine Motor Parts catalog; p. 537, published in 2000.*

*Primary Examiner* — Ricky D Shafer
(74) *Attorney, Agent, or Firm* — Manatt, Phelps & Phillips

(57) ABSTRACT

A vehicle mirror assembly having a housing and dome-type mirror lens. The lens has a first base footprint portion with a constant radius of curvature and a diameter, and a second base footprint portion comprised of an elliptical portion with a base major axis and a base minor axis. The mirror lens includes a first surface portion having a first surface radius and conforming to the first base footprint portion. The lens additionally includes a second surface portion conforming to the second base footprint portion. The second surface portion is comprised of a second surface major radius of curvature corresponding to a major surface axis and a second surface minor radius of curvature corresponding to a minor surface axis.

21 Claims, 2 Drawing Sheets

(56) References Cited

U.S. PATENT DOCUMENTS

| | | | |
|---|---|---|---|
| 6,015,215 A * | 1/2000 | Herman | 359/864 |
| 6,138,286 A | 10/2000 | Robrahn et al. | |
| 6,227,674 B1 * | 5/2001 | Englander | 359/853 |
| 6,328,450 B2 | 12/2001 | Englander | |
| 7,012,761 B1 | 3/2006 | Schmidt et al. | |
| D528,484 S * | 9/2006 | Schmidt et al. | D12/187 |
| 7,134,759 B2 | 11/2006 | Schmidt et al. | |
| 7,699,479 B2 * | 4/2010 | Schmidt et al. | 359/869 |
| 8,777,428 B2 * | 7/2014 | Schmidt et al. | 359/868 |

* cited by examiner

TEARDROP SHAPED VEHICULAR MIRROR

This application is a continuation of U.S. application Ser. No. 12/328,929 filed Dec. 5, 2008 (which is now U.S. Pat. No. 8,777,428) which is a continuation of U.S. application Ser. No. 11/422,131 filed Jun. 5, 2006, (which is now U.S. Pat. No. 7,699,479), which is a continuation-in-part of U.S. application Ser. No. 29/214,660 filed Oct. 6, 2004 (which is now U.S. Pat. No. D528,484) entitled TEARDROP SHAPED MIRROR, the entire contents of all of which are incorporated herein by reference. all of which are incorporated herein by reference.

TECHNICAL FIELD

The present invention relates generally to an exterior automotive mirror assembly, and, more particularly to front-end mounted exterior automotive cross-over mirrors.

BACKGROUND OF THE INVENTION

Automotive mirror assemblies can play a vital role in vehicle operation. Placement of the vehicle operator within the vehicle structure often makes direct line-of-sight to surrounding vehicle areas impractical. Yet such visual inspections of surrounding areas can provide the vehicle operator with information necessary for proper vehicle operation. As vehicle size increases, so often does the difficulty of accurate visual inspections. Vehicles, such as school buses, often utilize increased vehicle sizes while requiring visual inspection of areas in front of and to the side of the vehicle. To this end, it is well known that vehicle mirrors may be front-end mounted to the vehicle to provide the widest possible field of view around the vehicle.

Early attempts at widening the operator's field of view focused on the use of convex mirrors. By increasing the size of the convex minor, it was discovered that the field of view could be increased. Unfortunately, increasing the size of the convex mirror quickly becomes inefficient as the mirror itself begins to become an obstruction to forward viewing. To accommodate the need for increased field of view, without negatively impacting mirror size, it is known that a domed mirror lens may incorporate a varying radius of curvature along one of either the major or minor axis. The varying radius of curvature achieves a compacted wide field of view or viewing area within minimal space such that the driver can look forward of the vehicle with minimal blockage of vision. These mirrors with varying radius of curvature along one axis are commonly referred to as cross-over mirrors.

Although the use of cross-over mirror designs has proven highly successful in the increase of viewing area while minimizing mirror size, present designs still can incorporate drawbacks. One of the drawbacks of these common cross-over mirror designs results from the distortion of images reflected in the mirror. Image distortion can result from the depth of the dome and the varying radius of curvature of the lens. This distortion can result in a reflected image of an object that is either elongated or widened depending on the orientation of the axes of the mirror. Present designs, further limit the usefulness of such mirrors by requiring the mirror to be designed to provide either a larger image or a wider field of view.

It would, therefore, be highly desirable to have a mirror assembly that provides a combination of larger image size and wider field of view. It would further be highly desirable to have a mirror assembly that could provide such a combination of viewing benefits while minimizing distortion of images reflected in the mirror assembly.

SUMMARY OF THE INVENTION

A vehicle mirror assembly is provided. The vehicle mirror assembly includes a lens comprised of a first portion having a constant first radius of curvature and a first diameter, and a second portion comprised of an elliptical portion having a major axis and a minor axis. The shape of the lens from both a top view and a side view comprises a portion of a circular shape and a portion of an elliptical shape. The vehicle mirror assembly further includes a base or housing conforming to the lens footprint.

Other features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
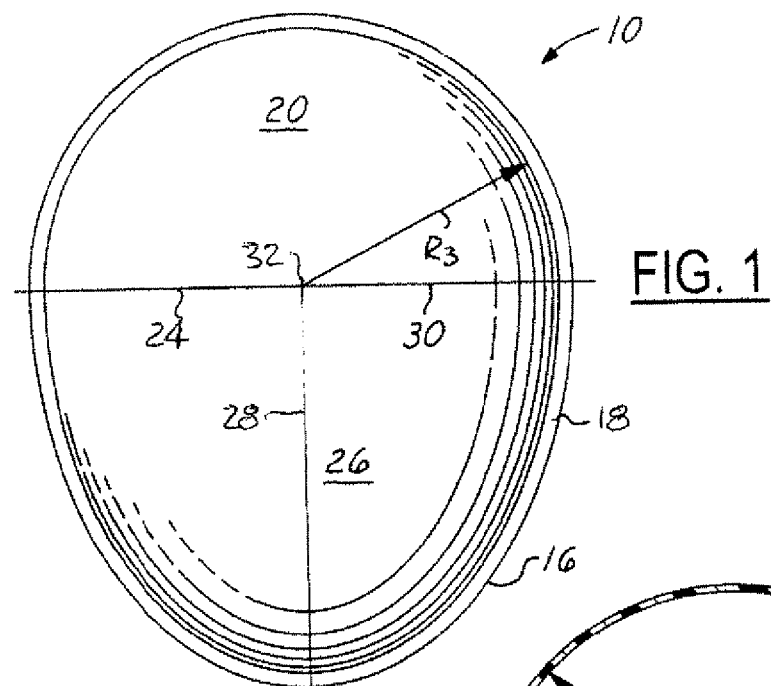
FIG. 1 is a top view illustration of a "teardrop" shaped mirror lens in accordance with the present invention.
Figure 3:
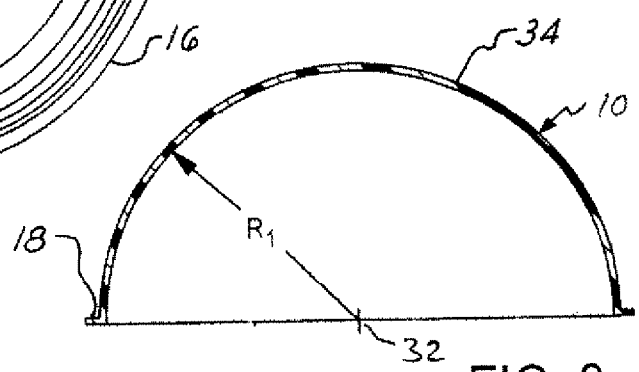
FIG. 3 is a cross-sectional illustration of the mirror lens illustrated in FIG. 2, the cross-section taken along the line 3-3 in FIG. 2 and in the direction of the arrows.
Figure 2:
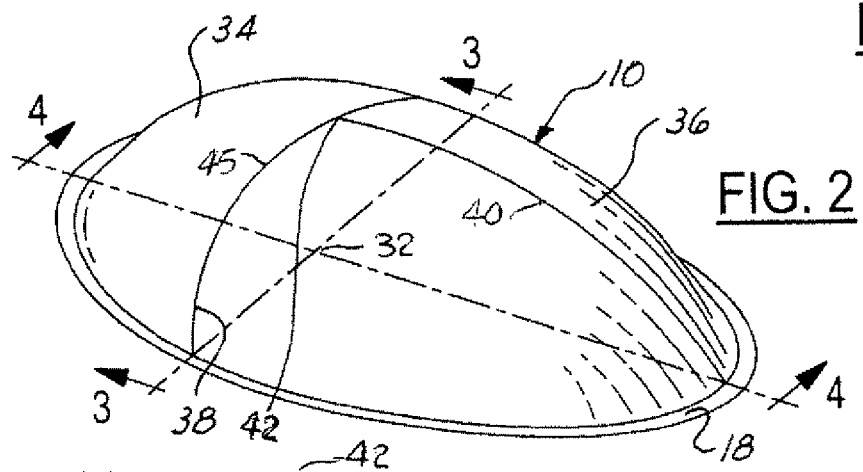
FIG. 2 is perspective view illustration of the mirror lens illustrated in FIG. 1.
Figure 4:
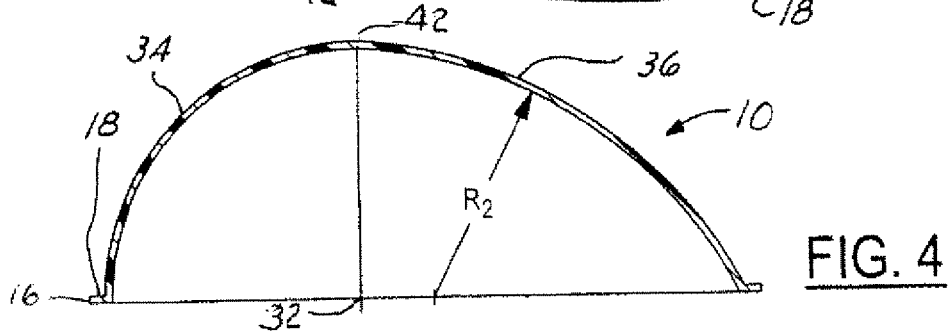
FIG. 4 is a cross-sectional illustration of the mirror illustrated in FIG. 2, the cross-section taken along the line 4-4 in FIG. 2 and in the direction of the arrows.

Referring now to FIG. 1, which is an illustration of a mirror lens 10 in accordance with the present invention. Although the mirror lens 10 is referred to with the terminology "teardrop", it should be understood that a variety of descriptors (such as "raindrop," etc.) may be utilized to describe the geometric configuration of the mirror lens 10. The mirror lens 10 generally has a convex dome shape and has an outer peripheral flange 18. The lens is typically mounted on a housing (such as housing 100 in FIG. 8) forming a mirror assembly. The flange 18 preferably seats on a mating flange of the housing and is mounted thereon. Preferably, a gasket or similar member is utilized to cover the two mating flanges. It should be understood that the flange on the housing preferably comports to the configuration of the periphery of the mirror lens 10.

The footprint of the lens 10 has a first base portion 20. The portion 20 has a constant radius of curvature $R_3$ and a first diameter 24. The mirror lens 10 footprint further comprises a second base portion 26 which is substantially elliptical in shape. The elliptical portion 26 has a major axis 28 and a minor axis 30. The minor axis 30 of the elliptical portion 26 is coincident with and equal to the first diameter 24 of the constant radius of the first portion 20. The major axis 28 of the elliptical portion 26 intersects the first diameter 24 at intersection point 32. The peripheral edge 16 of the lens 10 circumscribes the first and second portions 20 and 26, as shown.

The dome of the mirror lens 10 is a partial ellipsoid that comprises a first surface portion 34 which preferably has a constant first surface radius of curvature $R_1$ which is preferably proportionate and complementary to the first portion 20 of the lens footprint. The first surface portion 34 of the mirror lens preferably has a diameter to height ratio of approximately 2.0:1.0 to about 2.5:1.0. In a particularly preferred embodiment hereof, the first surface portion 34 comprises one half of the mirror lens disclosed and claimed in U.S. Pat. No. 4,436,372, the disclosure of which is hereby incorporated by reference.

The dome of the mirror lens 10 has a second surface portion 36 which is integral with the first surface portion 34 and is merged therewith at an imaginary merge or split line 38. The second surface portion 36 of the mirror lens 10 conforms to the conformation of the second or elliptical portion 26 of the lens footprint. The second surface portion 36 comprises a segment of an oval elliptical mirror lens having a major surface axis 40 which corresponds to the major axis 28 of the lens 10 footprint. The second surface portion 36, also has a minor surface axis 45 which corresponds to the minor axis 30 of the lens 12. The second surface portion 36 has a second surface major curvature $R_2$ which may be either constant, varying, or continuously varying, as desired, along the extent thereof. $R_3$ is preferably a constant radius and is preferably equal to and coincident with the radius $R_1$ Where $R_2$ has a varying radius of curvature, the second surface portion 36 hereof preferably comprises a segment of the oval elliptical mirror disclosed as in U.S. Pat. No. 5,589,984, the disclosure of which is hereby incorporated by reference.

The present mirror lens 10 may be manufactured from any suitable "silverized" plastic by any suitable mode including thermoforming, injection molding, forming or the like. The materials of construction are preferably selected such that upon formation there is no collapse at the central portion of the lens to thus eliminate any potential of negative curvatures and distortion. The thermoforming process may comprise either a forced air process or a vacuum forming process, both of which are well known to the skilled artisan. Where the lens is manufactured by a vacuum forming process, a vacuum chamber equipped with evacuation means is typically provided with an opening conforming to the shape of the minor lens 10 and over which is placed a sheet of softened plastic. Thereafter, a vacuum is drawn within the chamber causing the softened plastic to "drop" within the chamber, cool, and then harden. Upon cooling and hardening, the plastic sheet assumes a shape which conforms to that of the lens 10. Forced air thermoforming is similar to vacuum forming, in that heat pressurized air is utilized to cause the softened, warm plastic sheet to form over an opening. Injection molding may additionally be utilized in order to mold the lens 10 to desired specifications. It should be understood, however, that although specific manufacturing methodologies have been described, a variety of manufacturing methodologies may be utilized to implement the present invention.

Using any of the aforementioned manufacturing processes, it is preferable that the mirror lens 10 is formed, using the first footprint portion 20 with a constant radius $R_3$ and the second footprint portion 26 shaped as an elliptical portion. The first portion 34 has a constant radius $R_1$ (which preferably is the same as $R_3$), and the second surface portion 36 has a varying radius of curvature $R_2$ along the major surface axis 40. The second surface portion 36 also has a constant radius of curvature $R_1$ across the minor surface axis 45 thereof. Regardless of orientation, the mirror lens 10 provides a field of view which provides improved imaging with a reduction in the distortion of the image thereof. It should be noted that at the apex or intersection 42 of the surface axes 40, 45, the lens 10 preferably has a diameter to height ration ranging from about 2.0 to about 2.5 and, most preferably from about 2.1 to about 2.5.

The present lens or dome 10, which resembles a raindrop or teardrop, provides a larger field of view in the first surface portion 34 (the round side) and a larger image size on the second surface portion 36 (the elliptical side). In other words, by practicing the present invention, the base minor axis 30 of the mirror 10 is being shifted from the center of the mirror, as measured along the base major axis 28 of the lens 10, by a distance of approximately one-tenth to one-fourth of the length of the major axis 28. This shifting enables the difference in the observable images in the mirror, i.e., large field of view versus large image.

It should be further noted with respect hereto that in manufacturing the present mirror the thermoplastic resin used to form the lens 10 may have a colorant or dye incorporated therewith such that the resulting lens comprises a colored reflective surface. Although the color or hue is chosen at the option of the user, preferred colors include a legal blue hue, amber and the like. Optionally, a glare reducing color can be chosen. Because the color is imparted to the resin which is used to form the lens 10, it is seen through the silverized or reflective layer which is deposited onto the surface of the lens or dome. Although a particular embodiment has thus been described, it should be understood that a wide variety of configurations are contemplated.

Figure 5:
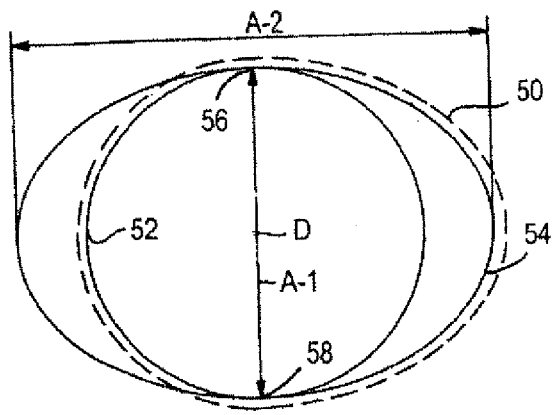
FIGS. 5 and 6 schematically depict the formation of the mirror lens curvature in accordance with the present invention.
Figure 6:
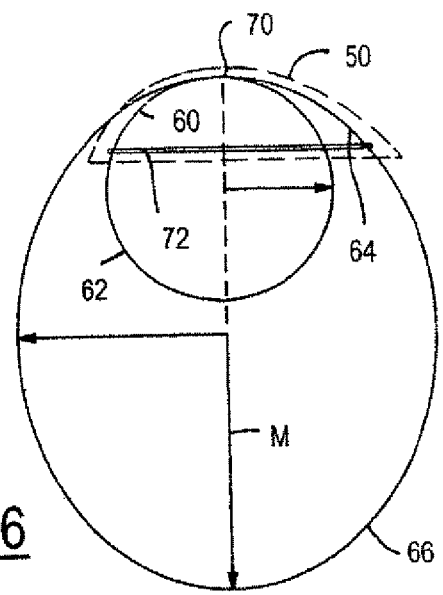

FIGS. 5 and 6 schematically depict the manner in which the shape of an embodiment of the inventive mirror lens 50 is formed from circular and elliptical figures. From a top or plan view, as shown in FIG. 5, the lens 50 (depicted generally in dashed lines) is formed from approximately one-half of a circular shape 52 and approximately one-half of an ellipse 54. The two shapes 52 and 54 are tangential to each other at points 56 and 58 which are the opposite ends of both the diameter D of circular shape 52 and the length of the minor axis A-1 of the ellipse 54. The major axis of the elliptical shape 54 is indicated by the reference A-2.

From a side or cross-sectional view, as shown in FIG. 6, the shape of the mirror lens 50 (again depicted generally in dashed lines) is formed from a portion 60 of a circular shape 62 and a portion 64 of an elliptical shape 66. The two shapes 62 and 66 are tangential to each other at point 70 which is approximately at one end of the major axis M of the ellipse 66. A flange or rim 72 on the mirror lens 50 is also included in FIG. 6.

Figure 7:
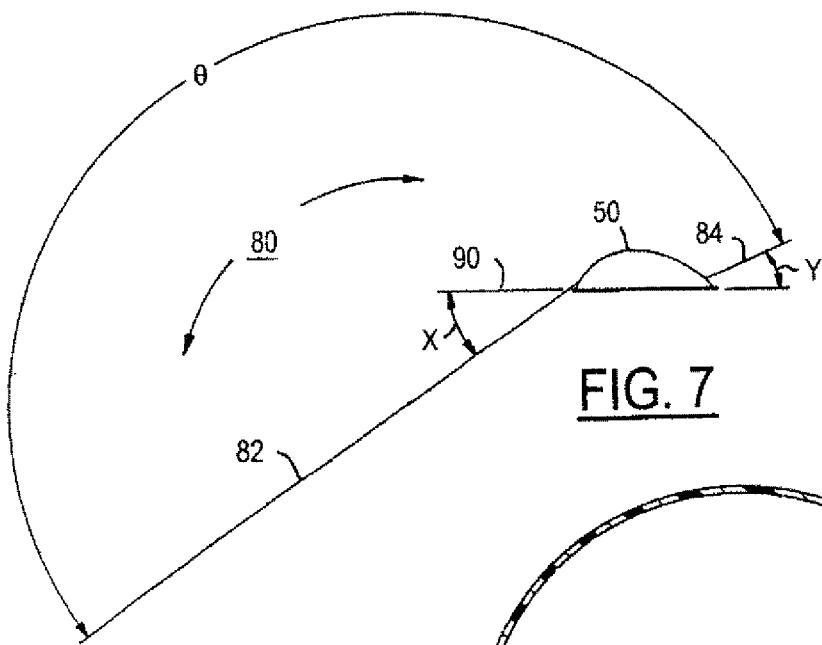
FIG. 7 depicts the field of view of a mirror made in accordance with the present invention.

The large field of view of the mirror lens 50 formed in accordance with the present invention is shown in FIG. 7 and indicated generally by the reference numeral 80 and the angle θ. As indicated, the field of view is more than 180° and is wider and larger in one direction 82 than the other 84. The direction 82 is angle X behind and beyond the edge of the lens 50 (formed by reference plane 90), while the direction 84 is less than the plane 90 by angle Y. The valves of angles X and Y will depend on the sizes and shapes of the circular and elliptical figures from which the mirror lens is formed.

Figure 8:
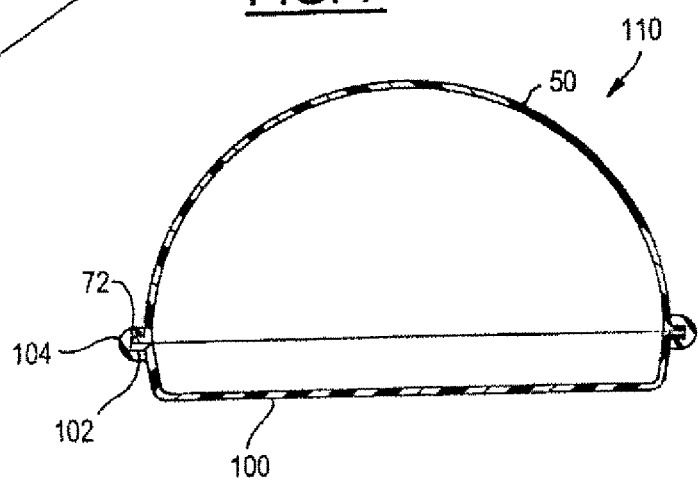
FIG. 8 depicts a preferred use of the inventive lens mounted on a base or housing.

FIG. 8 illustrates the mounting of the mirror lens 50 on the base or housing 100 thereby forming a mirror assembly 110. The base or housing can be of any conventional material, such as metal or plastic, in use today for the backs of vehicle mirrors, and can be formed in any conventional manner. The base 100 has the same footprint shape as the lens 50 and has a perimeter flange member 102 which mates with the perimeter flange 72 on the lens 50. Preferably, a rubber or elastomeric gasket member 104 is positioned around the mirror assembly which acts to hold the lens and base together. The gasket member also seals the inside of the mirror assembly from environmental conditions and adds a pleasing and finished appearance to the assembly.

It is also possible to include a mounting mechanism (not shown), such as a conventional ball-type or tunnel type mounting mechanism, on the base or housing 100 in order to mount or attach the mirror assembly to a vehicle or other structure.

While particular embodiments of the invention have been shown and described, numerous variations and alternative embodiments will occur to those skilled in the art. Accordingly, it is intended that the invention be limited only in terms of the appended claims.

What is claimed is:

1. A mirror assembly comprising:
   (a) a base member;
   (b) a dome-type mirror lens connected to said base member, said lens comprising:
      (i) a first portion comprising a portion of a sphere having a substantially constant first radius of curvature throughout; and
      (ii) a second portion comprising a portion of an oval ellipsoid having a second radius of curvature along a minor axis, and having a third radius of curvature along a major axis, the third radius of curvature being greater than said first and second radii of curvature.

2. A mirror assembly as described in claim 1 wherein said first portion is integral and merged with said second portion along a merge line.

3. A mirror assembly as described in claim 1 wherein said third radius of curvature comprises a varying radius of curvature.

4. A mirror assembly as described in claim 3 wherein said third radius of curvature comprises a varying radius of curvature which decreases along an outer surface of said second portion toward an outer perimetral edge.

5. A mirror assembly as described in claim 1 wherein said first portion produces a larger field of view than said second portion and said second portion produces a larger image view than said first portion.

6. A mirror assembly as described in claim 1 wherein said minor axis is shifted from a center of a length of said base member.

7. A mirror assembly as described in claim 1 wherein said minor axis is positioned a distance of approximately one-tenth to approximately one-fourth a length of said major axis from a center of a length of said base member.

8. A mirror assembly comprising:
   (a) a base member;
   (b) a dome-type mirror lens connected to said base member, said lens comprising:
      (i) a first portion comprising a portion of a sphere having a substantially constant first radius of curvature throughout; and
      (ii) a second portion comprising a portion of an oval ellipsoid wherein said second portion is adjacent to said first portion, said second portion having a second radius of curvature along a minor axis, and having a third radius of curvature along a major axis, the third radius of curvature being greater than said first and second radii of curvature.

9. A mirror assembly as described in claim 8 wherein said first portion is integral and merged with said second portion along a merge line.

10. A mirror assembly as described in claim 8 wherein said third radius of curvature comprises a varying radius of curvature.

11. A mirror assembly as described in claim 10 wherein said third radius of curvature comprises a varying radius of curvature which decreases along an outer surface of said second portion toward an outer perimetral edge.

12. A mirror assembly as described in claim 8 wherein said first portion produces a larger field of view than said second portion and said second portion produces a larger image view than said first portion.

13. A mirror assembly as described in claim 8 wherein said minor axis is shifted from a center of a length of said base member.

14. A mirror assembly as described in claim 8 wherein said minor axis is positioned a distance of approximately one-tenth to approximately one-fourth a length of said major axis from a center of a length of said base member.

15. A mirror assembly comprising:
   (a) a base member;
   (b) a dome-type mirror lens connected to said base member, said lens comprising:
      (i) a first portion having a diameter and a height and comprising a portion of a sphere having a substantially constant first radius of curvature throughout, said first portion having a diameter to height ratio in a range of between 2:1 to 2.5:1; and
      (ii) a second portion comprising a portion of an oval ellipsoid having a second radius of curvature along a first axis substantially the same as the first radius of curvature of said first portion, and having a third radius of curvature along a second axis.

16. A mirror assembly as described in claim 15 wherein said first portion is integral and merged with said second portion along a merge line.

17. A mirror assembly as described in claim 15 wherein said third radius of curvature comprises a varying radius of curvature.

18. A mirror assembly as described in claim 17 wherein said third radius of curvature comprises a varying radius of curvature which decreases along an outer surface of said second portion toward an outer perimetral edge.

19. A mirror assembly as described in claim 15 wherein said first portion produces a larger field of view than said second portion and said second portion produces a larger image view than said first portion.

20. A mirror assembly as described in claim 15 wherein said first axis is shifted from a center of a length of said base member.

21. A mirror assembly as described in claim 15 wherein said first axis is positioned a distance of approximately one-tenth to approximately one-fourth a length of said major axis from a center of a length of said base member.

* * * * *